US006256067B1

(12) United States Patent
Yamada

(10) Patent No.: US 6,256,067 B1
(45) Date of Patent: Jul. 3, 2001

(54) ELECTRONIC CAMERA FOR SELECTIVELY PHOTOGRAPHING A SUBJECT ILLUMINATED BY AN ARTIFICIAL LIGHT SOURCE

(75) Inventor: Norihide Yamada, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 08/905,514

(22) Filed: Aug. 4, 1997

(30) Foreign Application Priority Data

Aug. 7, 1996 (JP) .................................... 8-225918

(51) Int. Cl.$^7$ .......................... H04N 5/222; H04N 5/335; H04N 5/235
(52) U.S. Cl. ............................ 348/370; 348/297; 348/229
(58) Field of Search .................................... 348/370, 371, 348/88, 89, 90, 91, 92, 296, 297, 299, 307, 308, 312, 226, 362, 68, 69, 229; 378/98.8, 98.11; 235/462.8, 462.41, 462.42; 250/208.1, 208.2, 214.1, 214 R

(56) References Cited

U.S. PATENT DOCUMENTS

| | | | |
|---|---|---|---|
| 3,967,111 | * | 6/1976 | Brown ................................ 250/214 R |
| 4,300,167 | * | 11/1981 | Miller et al. ........................... 348/296 |
| 4,651,031 | * | 3/1987 | Bell et al. ............................. 348/312 |
| 4,682,238 | * | 7/1987 | Cawthorne ........................... 348/296 |
| 4,803,550 | * | 2/1989 | Yabe et al. ............................. 348/68 |
| 4,957,346 | * | 9/1990 | Wood et al. ........................... 348/68 |
| 4,992,855 | * | 2/1991 | Takei ................................... 348/226 |
| 5,010,412 | * | 4/1991 | Garriss ................................. 348/371 |
| 5,233,428 | * | 8/1993 | Alford et al. ......................... 348/296 |
| 5,337,341 | * | 8/1994 | Shumizu .............................. 378/98.8 |
| 5,517,243 | * | 5/1996 | Kudo et al. ........................... 348/296 |
| 5,559,850 | * | 9/1996 | Nekovar et al. ...................... 378/98.8 |
| 5,703,639 | * | 12/1997 | Farrier et al. ......................... 348/296 |
| 5,748,236 | * | 5/1998 | Shibazaki ............................. 348/370 |

OTHER PUBLICATIONS

D. M. Kuchta et al.; "Large—and Small—Signal Modulation Properties of RED (670 nm) VCSEL's", IEEE Photonics Technology Letters, vol. 8, No. 3, Mar. 1996.

* cited by examiner

Primary Examiner—Wendy R. Garber
Assistant Examiner—Jacqueline Wilson
(74) Attorney, Agent, or Firm—Ian Hardcastle

(57) ABSTRACT

An electronic camera that can take pictures in which the subject desired by the photographer appears alone, in which the subject is emphasized relative to the background, and in which a desired hue characteristic of the subject can be emphasized or diminished without requiring the use of complex image processing performed by a computer. The effects of backlight are also eliminated or reduced, and the subject is correctly exposed under backlighting or dark background conditions. The electronic camera comprises a light source arranged to illuminate a subject, an image sensor having a reversible detection sense, a lens arranged to focus light from the subject on the image sensor, and a control system. The control system modulates the light source to generate amplitude-modulated light. The control system also reverses the detection sense of the image sensor in phase with the modulation of the amplitude-modulated light.

18 Claims, 6 Drawing Sheets

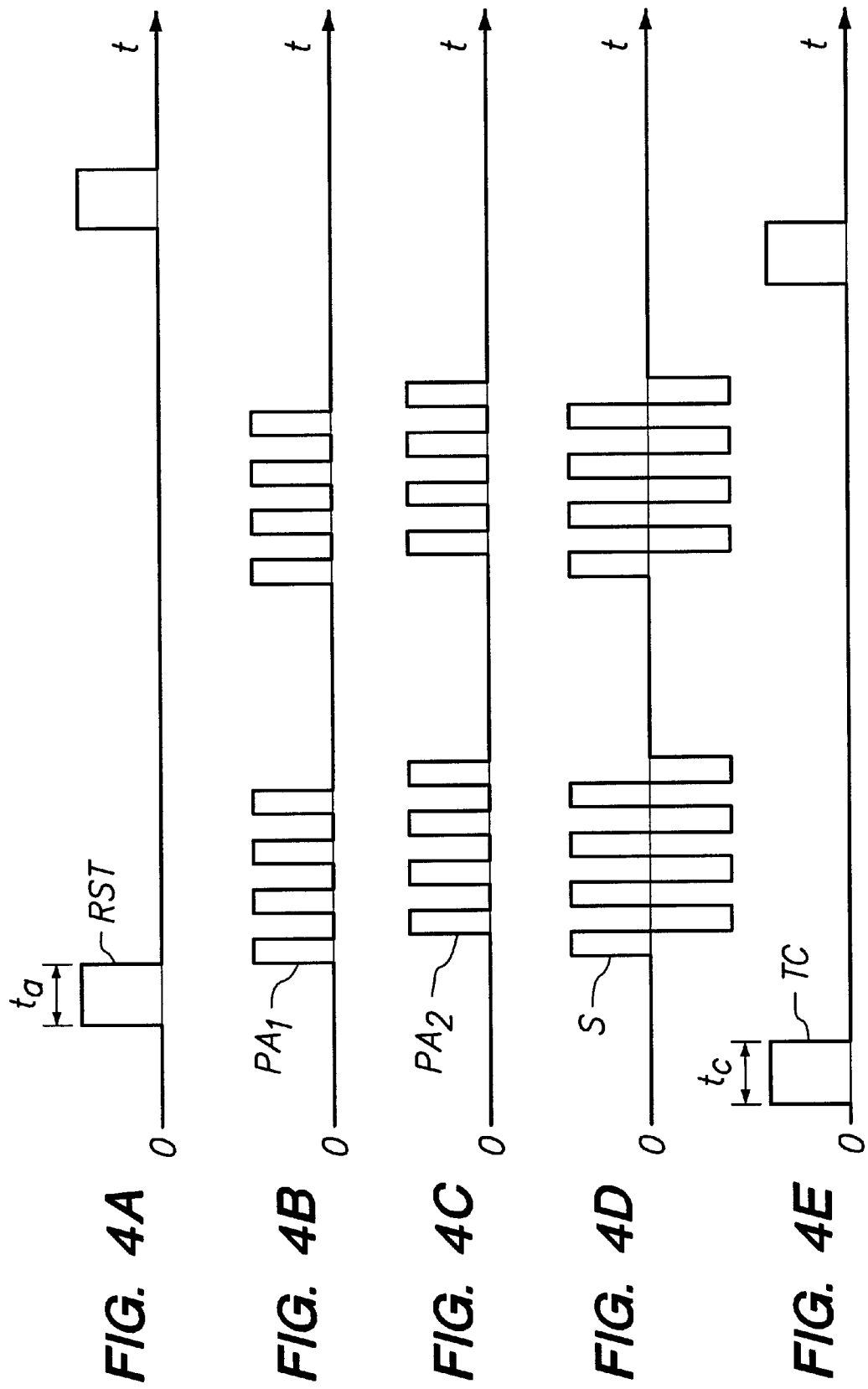

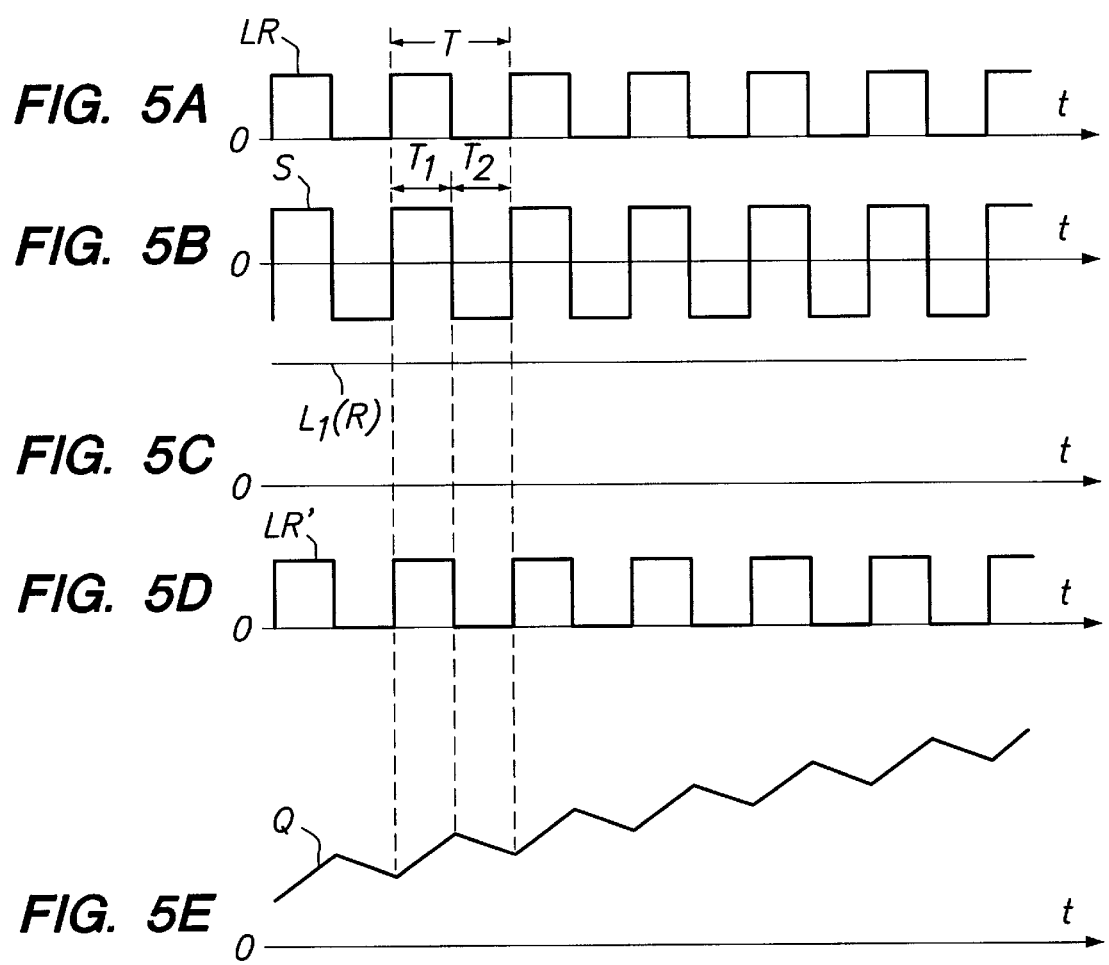

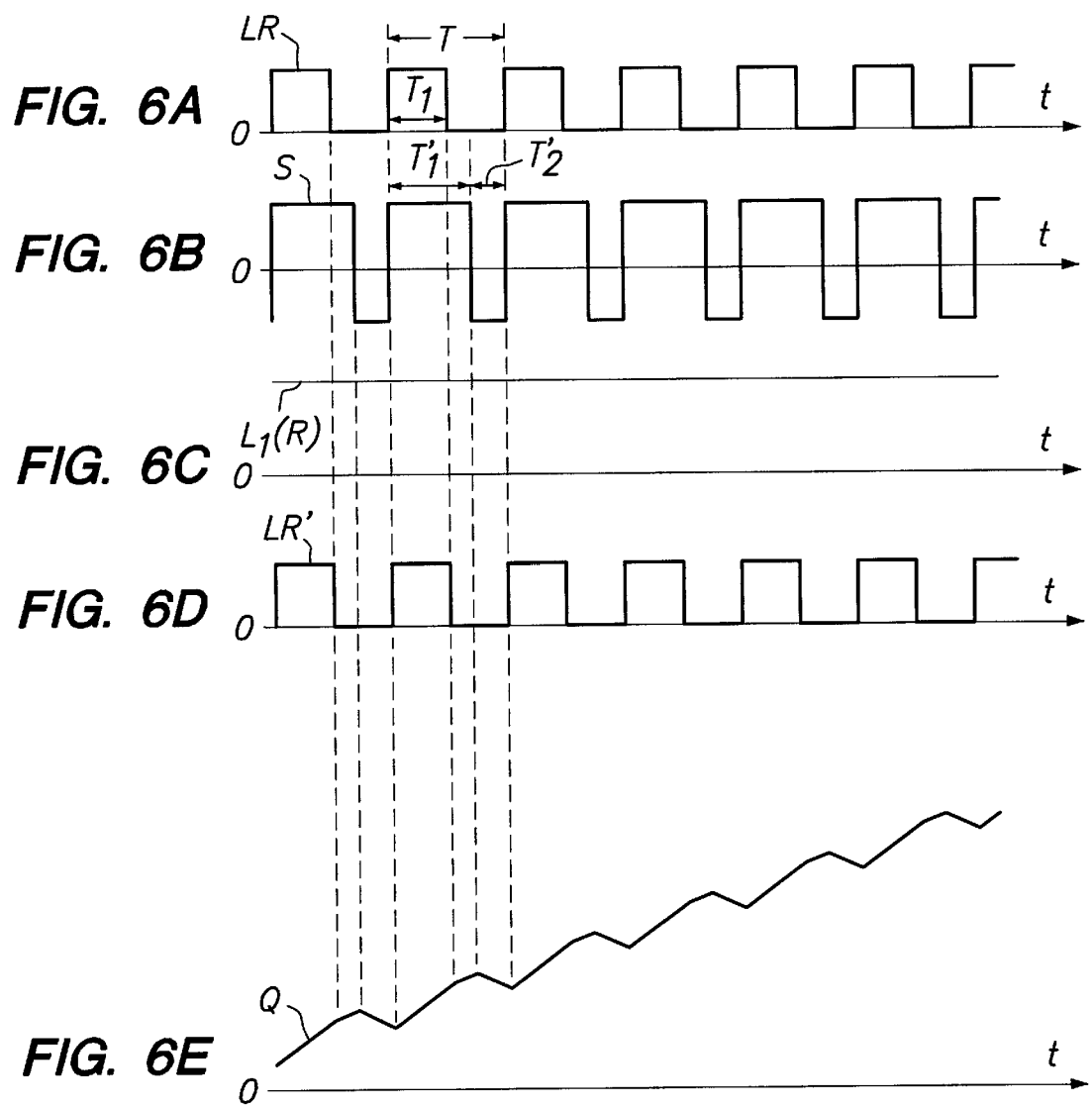

ELECTRONIC CAMERA FOR SELECTIVELY PHOTOGRAPHING A SUBJECT ILLUMINATED BY AN ARTIFICIAL LIGHT SOURCE

FIELD OF THE INVENTION

The present invention relates to an electronic camera capable of taking high-quality pictures in which the background to the subject is excluded so that the subject alone appears in the picture, or in which the subject and background both appear but the subject is enhanced relative to the background.

BACKGROUND OF THE INVENTION

Recently, electronic cameras have been used instead of conventional film-based cameras to take still pictures and motion pictures in monochrome and full color. In an electronic camera, light from the subject is focused on an image sensor. The image sensor is normally an array of charge-coupled optical detector elements, each of which includes a light detector and a charge storage device. The gate-to-substrate capacitance of an MOS transistor may be used as the charge storage device.

The light detector generates charge in proportion to the amount of light falling on it, and the charge is temporarily accumulated in the charge storage device. Then, a charge transport system transfers the accumulated charge from the charge storage device in each of optical detector elements to an image data generator. The image data generator generates image data representing the units of charge it receives. The image data output by the image data generator are subject to image processing and the set of data representing a picture of the subject is stored in a suitable memory. The charge transport system is typically a charge-coupled device (CCD). CCDs have superior performance, and are used in still picture and video cameras that take monochrome or color pictures The image sensor of an electronic camera and the photographic film of a film-based camera can both be regarded as light-sensitive elements. The light-sensitive element of an electronic camera and that of a film-based camera interact with light in basically the same way. The picture taken by the camera is the result of all of the light that falls on the light-sensitive element during the exposure. The light that falls on the light-sensitive element includes not only the light from the subject, but also additional light emitted or reflected by other objects in the field of view of the camera. Such other objects in the field of view of the camera constitute the background of the picture.

Pictures obtained from electronic cameras are in many ways similar to those obtained from film-based cameras. For example, to extract the subject and to eliminate the background in a picture generated by an electronic or film-based camera, the picture must be input into a computer as digital picture data. Then, graphics software is used to process the picture data to generate new picture data that represent the subject and not the background. A new picture containing the subject and not the background is then printed or displayed in response to the new picture data. If such processing is to be performed in real time on a motion picture (video) input and the subject is to be displayed in real time, a large-scale integrated circuit capable of performing high-speed image processing is required. A system to perform such processing is more complex and is more expensive to manufacture than the electronic camera itself In addition, pictures obtained from conventional electronic and film-based cameras suffer from many of the same defects. For example, the subject may be over-exposed in a picture taken by a conventional camera of a strongly-illuminated subject against a dark background. In another example, the subject may be under-exposed in a picture taken by a conventional camera of a subject under strong back lighting. Over- or under-exposure of the subject makes the picture unsatisfactory.

Furthermore, a special circuit is usually provided in an electronic camera to reduce or eliminate picture noise caused by the dark current of the light detectors of the image sensor. This special circuit increases the cost and complexity of the already-complex processing circuits in a conventional electronic camera.

What is needed is an electronic camera that can take pictures in which only the subject appears, that can take pictures in which the subject is enhanced relative to the background, and that can enhance a desired hue in the picture without the need to use a computer or other device to perform complex image processing.

What is also needed is an electronic camera that can eliminate or reduce the effects of backlighting and that can take properly-exposed pictures of the subject under backlighting conditions.

Finally, what is needed is an electronic camera in which picture noise caused by dark currents in the image sensor is reduced or eliminated without the need for complex additional circuitry.

SUMMARY OF THE INVENTION

The invention provides an electronic camera that can take pictures in which the subject desired by the photographer appears alone, or in which the subject is emphasized relative to the background, or in which a desired hue characteristic of the subject is emphasized or diminished without requiring the use of complex image processing performed by a computer. The camera also reduces or eliminates the effects of backlighting, and the subject is correctly exposed under backlighting or dark background conditions. The electronic camera comprises a light source arranged to illuminate a subject, an image sensor having a reversible detection sense, a lens arranged to focus light from the subject on the image sensor, and a control system. The control system modulates the light source to generate amplitude-modulated light. The control system also reverses the detection sense of the image sensor in phase with the modulation of the amplitude-modulated light.

The invention also provides an electronic camera that comprises a light source arranged to illuminate a subject, a circuit that modulates the light source to generate amplitude-modulated light, an image sensor having a lower sensitivity to ambient light than to the amplitude-modulated light reflected by the subject, and a lens arranged to focus light from the subject on the image sensor.

BRIEF DESCRIPTION OF THE DRAWINGS

FIGS. 4A–4E are timing diagrams showing the basic operation of the optical detector element shown in FIG. 3.

FIGS. 5A–5E are timing diagrams illustrating symmetrical operation of the optical detector element shown in FIG. 3.

FIGS. 6A–6E are timing diagrams illustrating asymmetrical operation of the optical detector element shown in FIG. 3.

DETAILED DESCRIPTION OF THE INVENTION

Figure 1:
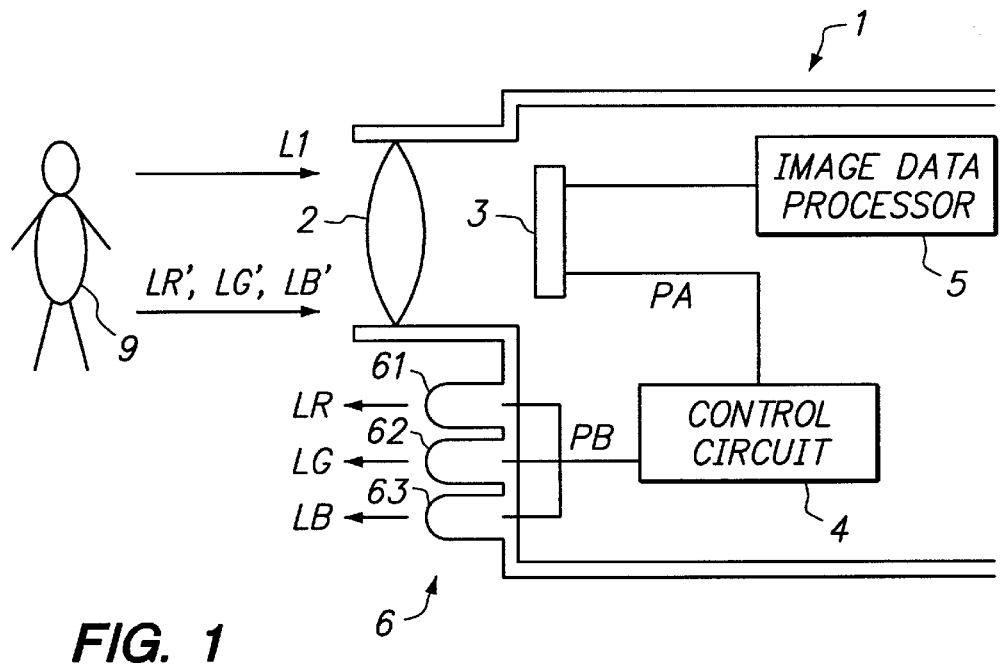
FIG. 1 shows a first embodiment of an electronic camera according to the invention.

The invention is based on the principle that, if a light source capable of amplitude modulation is provided in, or is operated in connection with, an electronic camera, the subject will be illuminated by the amplitude-modulated light from the light source regardless of other light sources that illuminate the subject. A picture is taken by exclusively detecting the modulated light reflected by the subject so that only the subject appears in the picture. Objects in the field of view of the camera that are not illuminated by the modulated light, i.e., the background, do not appear in the picture. Alternatively, the picture may be taken by detecting both ambient light and the modulated light reflected by the subject but with different sensitivities. In this case, the picture will also include the background, but the subject will be enhanced relative to the background. Ambient light is any light that enters the camera from a source other than the modulated light source.

The electronic camera according to the invention operates with a light source that generates light whose amplitude is modulated at a specific modulation frequency. The light source is arranged so that the subject that it is to be included in the picture is illuminated with the modulated light. The electronic camera includes a special image sensor and a lens that focuses light on the image sensor. The image sensor includes an array of optical detector elements, each of which includes a light detector and a charge storage device. The charge produced by the light detector in response to the light falling on it is accumulated in the charge storage device. The charge accumulated in the charge storage device of each of the optical detector elements is transferred to an image data generator that generates a set of data representing a picture of the subject.

The image sensor of the electronic camera according to the invention is special in that its sensitivity to the modulated light reflected by the subject is substantially greater than its sensitivity to ambient light. The image sensor may be operated so that its sensitivity to ambient light is substantially zero and its sensitivity to the reflected modulated light is substantially greater than zero. This enables the camera to take pictures of the subject alone and to eliminate the background, i.e., that which is not illuminated by the modulated light, from the picture. Alternatively, the image sensor may be operated so that its sensitivity to ambient light is greater than zero, but less than its sensitivity to the reflected modulated light. This enables the camera to take pictures in which the background is included, but the subject is enhanced relative to the background.

In a preferred embodiment, the image sensor is made less sensitive to the ambient light than to the modulated light by reversing the detection sense of the image sensor in phase with the modulation of the modulated light. The detection sense of the image sensor is reversed by inverting the sense in which the charge generated by the light detector in each of the optical detector elements constituting the image sensor accumulates in the respective charge storage device.

In this disclosure, the detection sense of the image sensor is a characteristic indicating whether each optical detector element constituting the image sensor operates so that the charge generated by the light detector in response to light increases the amount of charge accumulated in the charge storage device, or if the optical detector element operates so that the charge generated by the light detector in response to the light decreases the amount of charge accumulated in the charge storage device. When the charge generated by the light detector in response to light increases the charge accumulated in the charge storage element, the detection sense of the image sensor is said to be positive. When the charge generated by the light detector in response to the light decreases the charge accumulated in the charge storage element, the detection sense of the image sensor is said to be negative. The charge may increase in a positive or negative sense. The detection sense of the image sensor is reversed when the detection sense is changed from positive to negative or when the detection sense is changed from negative to positive. conventional electronic circuit technology can be used to reverse the detection sense of the image sensor at the same frequency as, and in phase with, the modulation of the light source. The duty cycle of the detection sense is the time during which the detection sense is positive divided by the sum of the time during which the detection sense is positive and the time during which the detection sense is negative. For example, when the time during which the detection sense is positive is equal to the time during which the detection sense is negative, the duty cycle is ½.

The detectivity of the image sensor is a characteristic indicating the amount of charge that flows into, or that is removed from, the charge storage device of each optical detector element constituting the image sensor in response to a predetermined amount of light falling on the respective light detector between successive reversals of the detection sense. Detectivity is positive when the detection sense is positive and is negative when the detection sense is negative. The duty cycle of the detectivity is the amount of charge that flows into the charge storage device when the detectivity is positive divided by the sum of the amount of charge that flows into the charge storage device when the detectivity is positive and the amount of charge removed from the charge storage device when the detectivity is negative. For example, when the amount of charge that flows into the charge storage device when the detectivity is positive is equal to the amount of the charge removed from the charge storage device when the detection sense is negative, the duty cycle is ½.

The sensitivity of the image sensor is a characteristic indicating the net amount of charge that accumulates in the charge storage device of each optical detector element constituting the image sensor in response to a predetermined amount of light falling on the respective light detector for a predetermined time. This time is called the exposure time.

The exposure time is the time during which the charge that is later transferred to the image data generator accumulates in the charge storage device. The exposure time is at least as long as one cycle of the modulation frequency of the light source, and is preferably as long as many cycles of the modulation frequency.

The light source can be a light-emitting diode (LED) or a laser diode (LD). Some commercially-available LEDs and LDs have an efficiency equal to or greater than that of a halogen lamp. The specific modulation frequency of the modulated light generated by the light source can be appropriately selected in the range from several tens of Hertz to several tens of gigahertz (GHz). The modulation frequency depends on the exposure time, i.e., the time during which the charge that is later transferred to the image data generator accumulates in the charge storage device of each optical detector element constituting the image sensor. While only one cycle of the modulation waveform need occur during the exposure time, it is preferable that many cycles of the amplitude modulation waveform occur during the exposure time. Similarly, while the detection sense of the image sensor need only reverse once during the exposure time, it is preferable that the detection sense reverse many times during the exposure time.

The preferred waveform of the amplitude-modulated light is a square wave, but this is not critical. Other waveforms may be used. Moreover, it is preferred that the minimum intensity of the amplitude-modulated light be zero, but this is not critical. Modulation waveforms that result in a non-zero minimum intensity may alternatively be used. The duty cycle of the modulated light is the ON time of the light source divided by the sum of the ON time and the OFF time. The duty cycle of the modulated light is preferably equal to the duty cycle of the detectivity of the image sensor, but this is not critical. The duty cycle of the modulated light may be less than that of the detectivity. Making the duty cycle of the modulated light longer than that of the detectivity reduces the sensitivity of the image sensor to the modulated light reflected by the subject.

The light detector of each optical detector element constituting the image sensor preferably includes a photoelectric conversion element such as a photodiode or a photoconductor. The charge storage device of each optical detector element is typically a capacitor. In a preferred embodiment, an N-MOS gate and the substrate are used as the electrodes of the capacitor. This arrangement is similar to the MOS capacitor in a CCD. The light detector and the charge storage device can be constructed as separate units or may be integrated in one unit.

The image sensor additionally includes a charge transport system that transports the charge accumulated in the charge storage device of each of the optical detector elements to the image data generator. The charge transport system is typically a charge-coupled device (CCD), but other charge transport devices, such as CSD, or an XY-addressed charge transport system, can be used.

If the image sensor is illuminated with light whose intensity remains substantially constant during the exposure time, and the net amount of charge that accumulates in the charge storage device of each optical detector element constituting the image sensor is zero, then the image sensor can be said to operate with a symmetrical detectivity. On the other hand, if a positive or negative amount of charge accumulates in the charge storage device during the exposure time, then the image sensor can be said to operate with an asymmetrical detectivity. The sensitivity of the image sensor to ambient light is zero when the image sensor operates with a symmetrical detectivity and is non-zero when the image sensor operates with an asymmetrical detectivity.

The image sensor operates with a symmetrical detectivity when the amount of charge removed from the charge storage device when the detection sense is negative is equal to the amount of charge that flows into the charge storage device when the detection sense of image sensor is positive. This results in a zero net charge accumulation in the charge storage device. The detectivity of the image sensor is symmetrical when its duty cycle is equal to ½. The duty cycle of the detectivity can be made equal to ½ by making the duty cycle of the detection sense equal to ½, and making the rate at which charge flows into the charge storage device when the detection sense is positive the same as that at which charge is removed from the charge storage device when the detection sense is negative. Alternatively, the rates at which charge flows into, and is removed from, the charge storage device can be unequal, and the duty cycle of the detection sense can be made different from ½ to compensate for the inequality in rates.

The image sensor operates with an asymmetrical detectivity when the amount of charge removed from the charge storage device when the detection sense is negative is different from the amount of charge that flows into the charge storage device when the detection sense of image sensor is positive. This results in a non-zero charge accumulation in the charge storage device. The detectivity is asymmetrical when its duty cycle is different from ½. The duty cycle of the detectivity can be made different from ½ by making the duty cycle of the detection sense different from ½ and making the rate at which charge flows into the charge storage device when the detection sense is positive the same as that at which charge is removed from the charge storage device when the detection sense is negative. Alternatively, the duty cycle of the detection sense can be made equal to ½ and the rate at which charge flows into the charge storage device when the detection sense is positive can be made different from that at which charge is removed from the charge storage device when the detection sense is negative.

The detection sense of the image sensor is reversed in phase with the modulated light generated by the light source such that detection sense is positive when the intensity of the modulated light is high, and the detection sense is negative when the intensity of the modulation source is low or zero. This way, the charge generated in response to the modulated light accumulates in the charge storage device in the same sense as the net charge generated in response to the ambient light.

Also, when the detectivity of the image sensor is symmetrical, a substantial reduction in picture noise caused by the dark current of the light sensor is obtained. This is because the charge that is generated by the dark current of the light sensor and that is accumulated in the charge storage device when the detection sense of the optical detector element is positive is removed from the charge storage device when the detection sense is negative. Cancellation between consecutive half cycles of the detection sense is not perfect due to the random nature of noise, but over a large number of cycles the charge accumulated in the charge storage device in response to the dark current tends towards zero. When the detectivity of the image sensor is asymmetrical, picture noise caused by the dark current of the light sensor is reduced, but the amount of noise reduction is less than that obtained with a symmetrical detection sense.

When the subject is illuminated by the modulated light generated by the light source, the reversals of the detection sense of the image sensor are in phase with the modulation of the light. In a preferred embodiment, the detection sense of the image sensor is positive when the intensity of the modulated light is high, and the detection sense of the image sensor is negative when the intensity of the modulated light is low, or zero. Thus, when reflected modulated light, i.e., modulated light reflected by the subject, falls on the image sensor in addition to the ambient light, additional charge flows into the charge storage device from the light detector in response to the reflected modulated light when the detection sense of the optical detector element is positive. However, little, if any, of this additional charge is removed from the charge storage device when the detection sense is negative because the modulated light illuminates the subject with a low intensity, or with zero intensity, when the detection sense is negative. This gives the image sensor a high sensitivity to the reflected modulated light.

In the electronic camera according to the invention, the image sensor has a greater sensitivity to the modulated light reflected by the subject than to the ambient light. As a result, the picture can be taken in such a way that it only includes the subject illuminated by the modulated light, and excludes the background. Moreover, when pictures are taken, the above-mentioned ill effects of backlight and dark backgrounds on the exposure of the subject can be eliminated. In addition, the background can also be included in the picture at a controlled exposure relative to that of the subject, as will be described next. Finally, a substantial reduction in picture noise due to the dark current of the light detectors is obtained.

The sensitivity of the image sensor of the electronic camera according to the invention to ambient light can be reduced to zero by operating the image sensor with a symmetrical detectivity. This enables the background to be eliminated from the picture. If, on the other hand, the photographer desires to include the background in the picture, or if the photographer desires that the subject appear in the picture illuminated in part by ambient light, the image sensor can be operated with an asymmetrical detectivity.

Operating the image sensor with an asymmetrical detectivity enables the background and ambient light reflected by the subject to be included in the picture. Operating the image sensor with an asymmetrical detectivity enables some of the charge generated in response to the ambient light to accumulate in the charge storage device of each optical detector element constituting the image sensor. For example, when the duty cycle of the detectivity of the optical detector elements constituting the image sensor is greater than ½, the image sensor will detect ambient light, including ambient light reflected by the subject, in addition to the modulated light reflected by the subject. Consequently, the background will appear in the picture. The contrast between the background and the subject is adjusted by changing the duty cycle of the detectivity of the image sensor. This adjustment can be made manually by the photographer, or automatically by an automatic exposure control device. When the duty cycle of the detectivity of the image sensor is made greater than ½, the duty cycle of the amplitude modulation of the light source may be similarly increased, or may be left at ½.

The electronic camera according to the invention can be a video camera or a still camera. It can also be used, for example, as the rearview mirror of a vehicle. In this case, it may not be necessary to display a color picture, and a single LED, LD or flash located on the back of the vehicle may be used as the light source. For example, the light source may be built into the tail lights of the car. The electronic camera according to the invention can also be used as a night vision camera when an infrared LED is used as the light source.

Embodiments of an electronic camera according to the invention will now be described with reference to FIGS. 1 through 8. In the embodiment shown in FIG. 1, the electronic camera 1 includes the lens 2, the image sensor 3, the control circuit 4, the image data processor 5, and the light source 6. FIG. 1 also shows the subject 9 located in front of the electronic camera in such a position that the subject is illuminated by the modulated light generated by the light source. In the embodiment shown in FIG. 1, the lens 2 is depicted as a single lens. The lens 2 may alternatively be composed of multiple lenses, and may be movable, at least in part, relative to the image sensor 3 to provide a variable focus.

Figure 2:
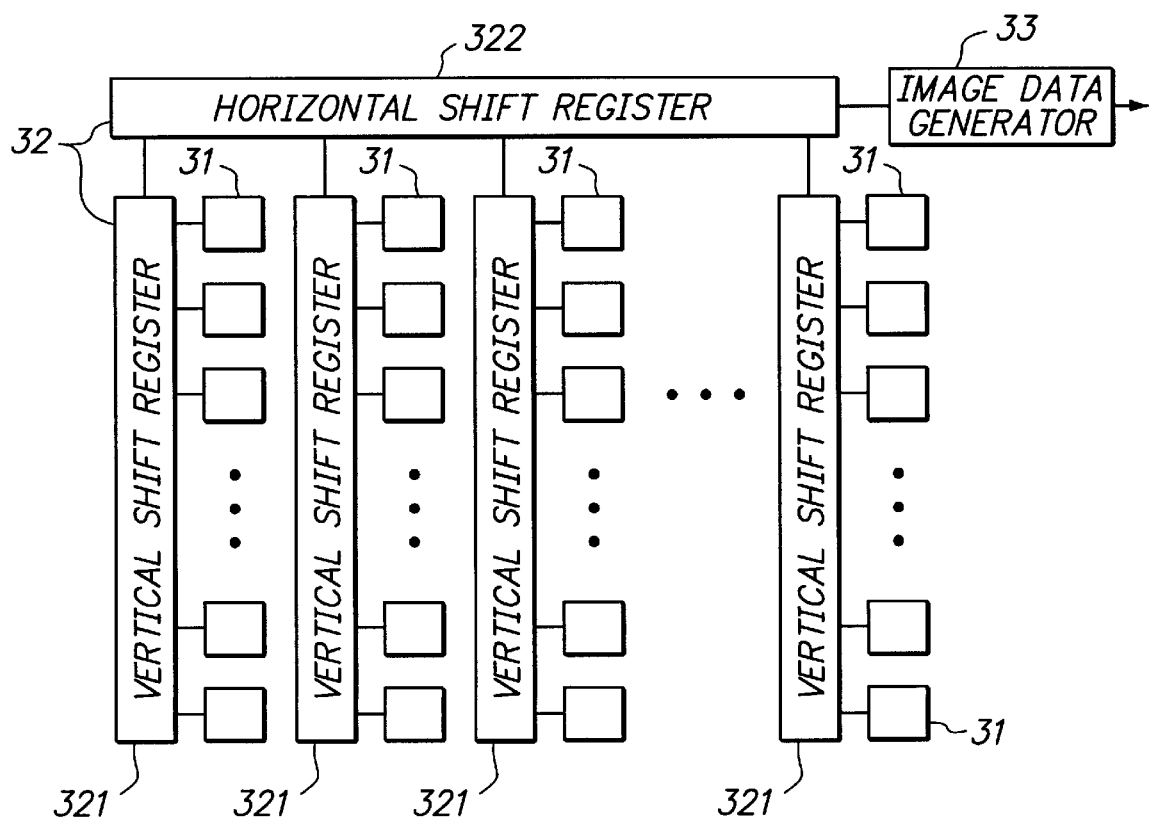
FIG. 2 shows the image sensor of the electronic camera shown in FIG. 1.

As will be described in more detail below, the image sensor 3 is composed of an array of optical detector elements, each of which includes a light detector and a charge storage device. The image sensor also includes the charge transport system 32, and the image data generator 33, as shown in FIG. 2. Although not shown in the drawings, a color filter, for example, a color filter composed of red filter elements, green filter elements, and blue filter elements, is located on or in front of the light-sensitive surface of the image sensor to enable the image signal generated by the image sensor to represent the colors of the light falling on the image sensor.

The control circuit 4 generates the drive signals PA and PB. The drive signals PA and PB respectively control the operation of the image sensor 3 and cause the light source 6 to generate the amplitude-modulated light LR, LG, LB.

The image data processor 5 receives image data from the image data generator 33 (FIG. 2) in the image sensor 3, applies image processing to the image data and feeds the image data to an image data memory (not shown).

In the example shown, the light source 6 is composed of three light-emitting devices (LEDs), each of which generates light of a different color. For example, the red LED 61, the green LED 62, and the blue LED 63 may constitute the light source. The intensities of the light generated by the LEDs are controlled to provide an appropriate color balance, e.g., white light. Alternatively, the color balance can be changed to emphasize or diminish a hue characteristic of the subject. A white-light electronic flash capable of emitting a series of short pulses of light may also be used as the light source. The light source 6 is shown built into the camera 1, but this is not critical. The light source can be mounted externally, and the electronic camera according to the invention can supply a control signal to the externally-mounted light source. Multiple light sources may be used.

FIG. 2 shows an example of the image sensor 3 in more detail. The image sensor 3 is composed of a two-dimensional array of the optical detector elements 31, the charge transport system 32, and the image data generator 33. The charge transport system 32 includes the vertical shift registers 321 and the horizontal shift register 322.

The optical detector elements 31 constituting one column of the array are connected to one of the vertical shift registers 321. The vertical shift registers transport the charges received from the optical detector elements respectively connected to them to the horizontal shift register 322. The horizontal shift register transports the charges received from the vertical shift registers to image data generator 33. The image data generator generates respective image data representing the charges received from the horizontal shift register.

Figure 3:
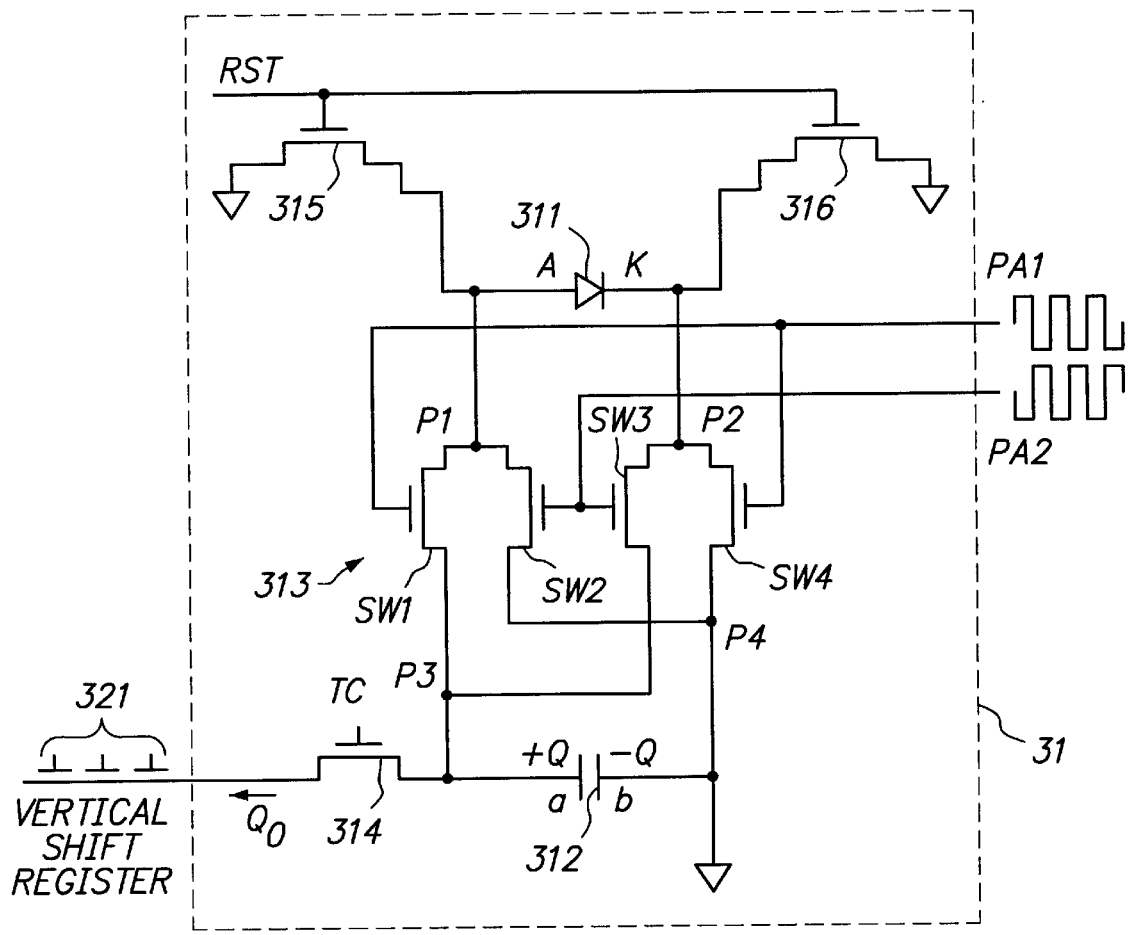
FIG. 3 is a circuit diagram of an exemplary one of the optical detector elements shown in FIG. 2.

FIG. 3 is a circuit diagram of an exemplary one of the optical detector elements 31 shown in FIG. 2. In the optical detector element 31, the photodiode 311 serves as a light detector, and the capacitor 312 serves as a charge storage device. In the example shown, the capacitance between an N-MOS gate and the substrate provides the capacitance of the capacitor 312. The optical detector element also includes the cross-connected change-over switch 313 composed of the MOS transistor switches $SW_1$ through $SW_4$. The cross-connected change-over switch controls the detection sense of the optical detector element 31. The cross-connected change-over switch circuits in the optical detector elements constituting the image sensor 3 collectively control the detection sense of the image sensor. Finally, the optical detector element includes the charge transport switch 314, and the reset switches 315 and 316, all of which are MOS transistors.

The anode A of the photodiode 311 is connected to the common point $P_1$ of the switches $SW_1$ and $SW_2$ and the cathode K of the photodiode is connected to the common point $P_2$ of the switches $SW_3$ and $SW_4$. Additionally, the anode A is connected to the reset switch 315 and the cathode K is connected to the reset switch 316. The reset signal RST causes the reset switches to connect both terminals of the photodiode 311 to ground.

The terminal a of the capacitor 312 is connected to the common point $P_3$ of the switches $SW_1$ and $SW_3$, and is also connected to the charge transport switch 314. The transfer signal TC causes the charge transport switch to connect the anode a to the input of the vertical shift register 321. The terminal b of the capacitor 312, and the common point $P_4$ of the switches $SW_2$ and $SW_4$ are connected to ground. The common points $P_1$ and $P_2$ are on the opposite sides of the switches $SW_1$–$SW_4$ from the common points $P_3$ and $P_4$.

The control signal PA shown in FIG. 1 is composed of the two antiphase components $PA_1$ and $PA_2$ shown in FIG. 3. The control signal component $PA_1$ is connected to the gates of the switches and the control signal component $PA_2$ is connected to the gates of the switches $SW_2$ and $SW_3$. The antiphase control signal components $PA_1$ and $PA_2$ cause the switches $SW_1$ through $SW_4$ to reverse the detection sense of the optical detector element 31 by inverting the sense in which the charge generated by the photodiode 311 accumulates in the capacitor 312. The control signal components determine whether the photodiode 311 adds charge to or removes charge from the capacitor. In the example shown, the switches are driven by multiple cycles of the control signal components, so the detection sense of the optical detector element is reversed multiple times at a rate determined by the frequency of the control signal components. In this embodiment, the rate at which charge flows between the photodiode and the capacitor is independent of the state of the cross-connected change-over switch 313, so the duty cycle of the detectivity of the optical detector element is equal to the duty cycle of the detection sense. The duty cycle of the detection sense depends on the duty cycle of the control signal PA.

Operation of the exemplary optical detector element 31 will be described next with reference to FIG. 4A–4E, and also with reference to FIGS. 1, 2 and 3. At the start of the exposure cycle, the control circuit 4 feeds the reset signal RST to the reset switches 315 and 316. The reset signal turns the reset switches ON for the brief, fixed period of time $t_a$ shown in FIG. 4A. The time period $t_a$ is long enough for any charge stored in the photodiode 311 to discharge through the reset switches. At the end of the time period $t_a$, the control circuit discontinues the reset signal RST, which causes the reset switches to turn OFF.

Next, the control circuit 4 feeds a predetermined number of cycles of the antiphase control signal components $PA_1$ and $PA_2$ to the optical detector element 31, as shown in FIGS. 4B and 4C. The control signal components $PA_1$ and $PA_2$ cause the cross-connected change-over switch 313 to repetitively reverse the detection sense of the optical detector element 31. The detection sense S of the optical detector element, and hence of the image sensor 3, is reversed twice as many times as the predetermined number of cycles, as shown in FIG. 4D. During this time, the reset switches 315 and 316 remain turned OFF.

The control circuit 4 additionally feeds the control signal PB to the light source 6. The control signal PB is synchronized to the control signal component $PA_1$ and modulates the amplitude of the light generated by the light source. Since the amplitude modulation of the modulated light LR, LG, LB generated by the light source is synchronized to the control signal component PB, it is also synchronized to the control signal components $PA_1$ and $PA_2$.

The subject 9 reflects part of the modulated light generated by the light source 6 back towards the camera 1 as the reflected modulated light LR', LG' and LB'. At the camera, the lens 2 focuses the reflected modulated light, together with ambient light received by the camera, on the image sensor 3. Part of the light focused on the image sensor falls on the photodiode 311 of the exemplary optical detector element 31. The photodiode generates charge representing the intensity of the light falling on it. The charge generated by the photodiode is accumulated in the capacitor 312 in the manner that will be described in detail below.

After the control circuit 4 has fed the predetermined number of cycles of the control signal components $PA_1$ and $PA_2$ to the image sensor 3 and has fed the control signal PB to the light source 6, and before it next feeds the reset signal RST to the image sensor, it feeds the transfer signal TC to the charge transport switch 314 for the brief, fixed period of time $t_c$ shown in FIG. 4E. The transfer signal TC turns the charge transport switch ON for the time $t_c$. During this time, the charge $Q_0$ stored in the capacitor 312 is transferred to the image data generator 33 via the charge transport switch 314, the vertical shift register 321 and the horizontal shift register 322. The image data generator 33 generates a unit of image data in response to the charge transferred from the exemplary optical detector element 31, and sends this unit of image data to the image processor 5.

The amount of charge $Q_0$ sent to the image data generator 33 from the capacitor 312 in the exemplary optical detector element 31 during the time $t_c$ in which the transfer signal TC is present represents the amount of light detected by the optical detector element during the current exposure cycle, i.e., the time between the end of the reset signal RST and the beginning of the transfer signal TC. At the end of the time $t_c$, the control circuit 4 discontinues the transfer signal TC. This turns the charge transfer switch 314 OFF, and marks the end of the current exposure cycle.

Next, a number of examples of the operation of the electronic camera 1 having the above structure will be described in detail, first with reference to FIG. 1, and then with reference to FIGS. 2 and 3. In the first example, the duty cycle of the modulated light LR, LG, LB generated by the LEDs 61 through 63 and that of the detection sense of the optical detector element 31 are both equal to ½. Consequently, the duty cycle of the detectivity of the optical detector element is equal to ½. The control circuit 4 feeds a predetermined number of cycles of the control signal PB to the LEDs 61, 62, 63. The duration of each cycle is the time T. In response to the control signal PB, the LEDs 61, 62, 63 generate the modulated light LR, LG, LB. The amplitude of the modulated light varies synchronously with the control signal PB, and is high for a time equal to ½T in each cycle of the control signal. The modulated light illuminates the subject 9. The subject may also be illuminated by ambient light in addition to the modulated light generated by the LEDs 61, 62, 63.

In this example, the phases of the control signals PA and PB are such that the LEDs 61, 62, 63 generate the modulated light LR, LG, LB in phase with the positive detection sense of the optical detector elements 31 constituting the image sensor 3. In other words, the LEDs generate light at the same times as the detection sense of the optical detector elements is positive. When the detection sense is positive, the cross-connected change-over switch 313 directs the charge generated by the photodiode 311 in response to the light falling on it into the capacitor 312 in a sense that increases the amount of charge accumulated in the capacitor. The increase in the charge accumulated in the capacitor is proportional to the light falling on the photodiode during the time that the detection sense is positive. In this example, the duration of each pulse of the modulated light and duration of each period that the detection sense of the optical detector element is positive are both in the range of 0.1 to 1 $\mu$s, corresponding to a repetition rate in the range of 1 to 10 MHz.

In the following description, which refers to FIG. 5A–5E, and also to FIGS. 1, 2 and 3, the photodiode 311 that forms part of the exemplary optical detector element 31 will be said to be covered by a filter that passes red light, for example. The photodiode 311 receives part of the reflected modulated red light LR' reflected by the subject 9. In addition, the photodiode receives part of the red light component $L_1(R)$ of the ambient light $L_1$. The ambient light $L_1$ is any light other than the reflected modulated light. For example, the ambient light can be any or all of light from the background of the subject, light from other light sources, light from a light source that is part of the subject, or light reflected by the subject from any source other than the light source 6.

As shown in FIG. 5A, the red LED 61 generates the modulated light LR during the time $T_1$, the first half of the time period T. During the time $T_1$, the detection sense S of the optical detector element 31 is positive, as shown in FIG.

5B. During the time $T_1$, the photodiode 311 generates an amount of charge $(q_0+q_1)$, of which the charge $q_0$ is generated in response to the reflected modulated light LR' and the charge $q_1$ is generated in response to the red light component $L_1(R)$ of the ambient light. The control signal components $PA_1$ and $PA_2$ set the switches SW1 through SW4 so that the charge generated by the photodiode flows into the capacitor 312 and increases the amount of charge accumulated in the capacitor.

During the time $T_2$, i.e., the latter half of the time period T, the LED 61 shown in FIG. 1 does not emit light. Consequently, the photodiode 311 does not receive the reflected modulated light LR'. During the time $T_2$, the photodiode 311 generates an amount of charge $q_2$ in response only to the red light component $L_1(R)$ of the ambient light. The control signal components $PA_1$ and $PA_2$ reverse the switches SW1 through SW4. This inverts the sense in which the charge generated by the photodiode is accumulated in the capacitor so that the charge generated by the photodiode flows out from the capacitor 312, and reduces the amount of charge accumulated in the capacitor. This reverses the detection sense of the optical detector element 31, and of the image sensor 3, so that the detection sense of the image sensor is now negative. Since the intensity of the ambient light falling on the photodiode 311 is substantially constant during the time period T, and since the times $T_1$ and $T_2$ are equal, the amount of charge $q_2$ removed from the capacitor in the time $T_2$ is about equal to the component $q_1$ of the charge that flowed into the capacitor in the time $T_1$. Consequently, the charges $q_1$ and $q_2$ cancel, and the charge actually accumulated in the capacitor 312 during the time period T is only $q_0$. The charge $q_0$ was generated by the photodiode in response to the reflected modulated light LR' alone.

An example of the intensity of the red light component $L_1(R)$ of the ambient light falling on the exemplary optical detector element 31 of the image sensor 3 is shown in FIG. 5C and an example of the intensity of the reflected modulated light LR' falling on the exemplary optical detector element 31 is shown in Figure SD. FIG. 5E shows how the charge Q accumulates in the capacitor 312 in response to the modulated light LR' alone in successive cycles of the modulated light.

In the following description, which refers to FIGS. 1, 2 and 3, the predetermined number of cycles of the control signals PA and PB generated by the control circuit 4 will be designated by n. In each exposure cycle, n units of the charge $q_0$ generated by the photodiode 311 in response to the reflected modulated light LR' are accumulated in the capacitor 312. When the transfer signal TC switches the charge transport switch 314 ON, the charge $Q_0$ resulting from this accumulation is transferred to the image data generator 33 via the charge transport switch, the vertical shift register 321 and the horizontal shift register 322. The image data generator 33 generates a unit of image data in response to the value of $Q_0$ generated by each of the optical detector elements 31 constituting the image sensor 3. The image data generator passes the resulting set of image data representing the image formed on the image sensor to the image data processor 5. The set of image data represents only the subject since the contribution of the ambient light to the image data is negligible.

When the intensity of the light falling on the photodiode 311 is sufficient to saturate the photodiode, the charge $q_2$ that is removed from the capacitor 312 when the detection sense of the optical detector element 31 is negative is equal to the charge $(q_0+q_1)$ that flows into the capacitor when the detection sense is positive. In other words, when the photodiode is saturated, $q_2=q_0+q_1$. As a result, the net accumulation of charge in the capacitor 312 is always zero during each period of the control signals PA and PB. Saturation of the photodiodes prevents the image data generator 33 from generating a unit of data that represents the charge $q_0$ generated by the photodiode in response to the reflected modulated light LR'. However, by making the period of the control signals PA and PB very short, such as 0.1 μs, the photodiode can be prevented from saturating even when it is exposed to strong light such as sunlight. Therefore, even if the photodiode 311 receives ambient light from light sources such as the sun or street lights, for example, the camera will be able to take a picture in which the subject 9 appears alone. Everything that is not illuminated by the modulated light generated by the LED 61 is excluded from the picture.

It is often desirable for the picture to include a background, i.e., objects that are not illuminated by the modulated light generated by the light source 6, but to control the relative exposure between the subject and the background. Such pictures can be taken by increasing the duty cycle of the detectivity of the image sensor 3 to greater than ½, as will be described next with reference to FIGS. 6A–6E, and also to FIGS. 1, 2 and 3. In the example shown, the rates at which charge flows into and is removed from the capacitor are equal, so the duty cycle of the detection sense determines the duty cycle of the detectivity of the image sensor. FIG. 6A shows the waveform of the modulated light LR emitted by the exemplary LED 61. FIG. 6B shows the detection sense S of the image sensor. FIG. 6C shows the intensity of the red light component $L_1(R)$ of the ambient light falling on the exemplary optical detector element 31 of the image sensor 3. FIG. 6D shows the intensity of the reflected modulated light LR' falling on the exemplary optical detector element 31. FIG. 6E shows how the charge Q accumulates in the capacitor 312 in response to the reflected modulated light LR' and also in response to the red light component $L_1(R)$ of the ambient light in successive cycles of the modulated light.

The duty cycle of the modulated light generated by the LED 61 can be greater than ½, and can be made the same as the duty cycle of detection sense of the optical detector element 31, but is kept at ½ in this example. The modulated light LR is generated by the LED 61 in phase with the positive state of the detection sense S of the optical detector element 31.

In this example, the photodiode 311 generates the charge $q_0$ in response to the reflected modulated light LR' only during the time $T_1$, the first half of the time period T of the modulated light. Since the detection sense of the optical detector element 31 is positive during the time $T_1$, the charge q0 flows into the capacitor 312. The photodiode additionally generates charge $q_1$ in response to the red light component $L_1(R)$ of the ambient light. The charge $q_1$ flows into the capacitor 312 during the time $T_1'$ during which the detection sense S is positive. During the time $T_2'$ in which the detection sense S is negative, the photodiode generates the charge $q_2$ in response to the red light component $L_1(R)$ of the ambient light. Since the detection sense S is negative during this time, the charge $q_2$ is removed from the capacitor 312. In this case, since the duty cycle of the detection sense of the optical detector element 31 is greater than ½, $q_1>q_2$. Thus, the charge $(q_1-q_2)$ generated in response to the red light component $L_1,(R)$ of the ambient light is accumulated in the capacitor 312 during the time period T in addition to the charge $q_0$ generated in response to the reflected modulated light LR'.

Accordingly, making the duty cycle of the detectivity of the optical detector element 31 greater than ½ enables charge generated in response to the red light component $L_1(R)$ of the ambient light to be accumulated in the capacitor 312 in addition to the charge generated in response to the reflected modulated light LR'. This enables the background, which is not illuminated by the modulated light generated by the LED 61, to appear in the picture. The contrast between the subject and the background can be set by adjusting the duty cycle of the detectivity of the optical detector element. Additional control can be provided by independently adjusting the duty cycle of the modulated light generated by the light source 6.

In the example just described, the photodiode 311 of the exemplary optical detector element 31 was stated to be covered by a filter that passes red light. However, an optical detector element in which the photodiode is covered by a filter that passes green light, or one that passes blue light, operates in the same way.

Figure 7:
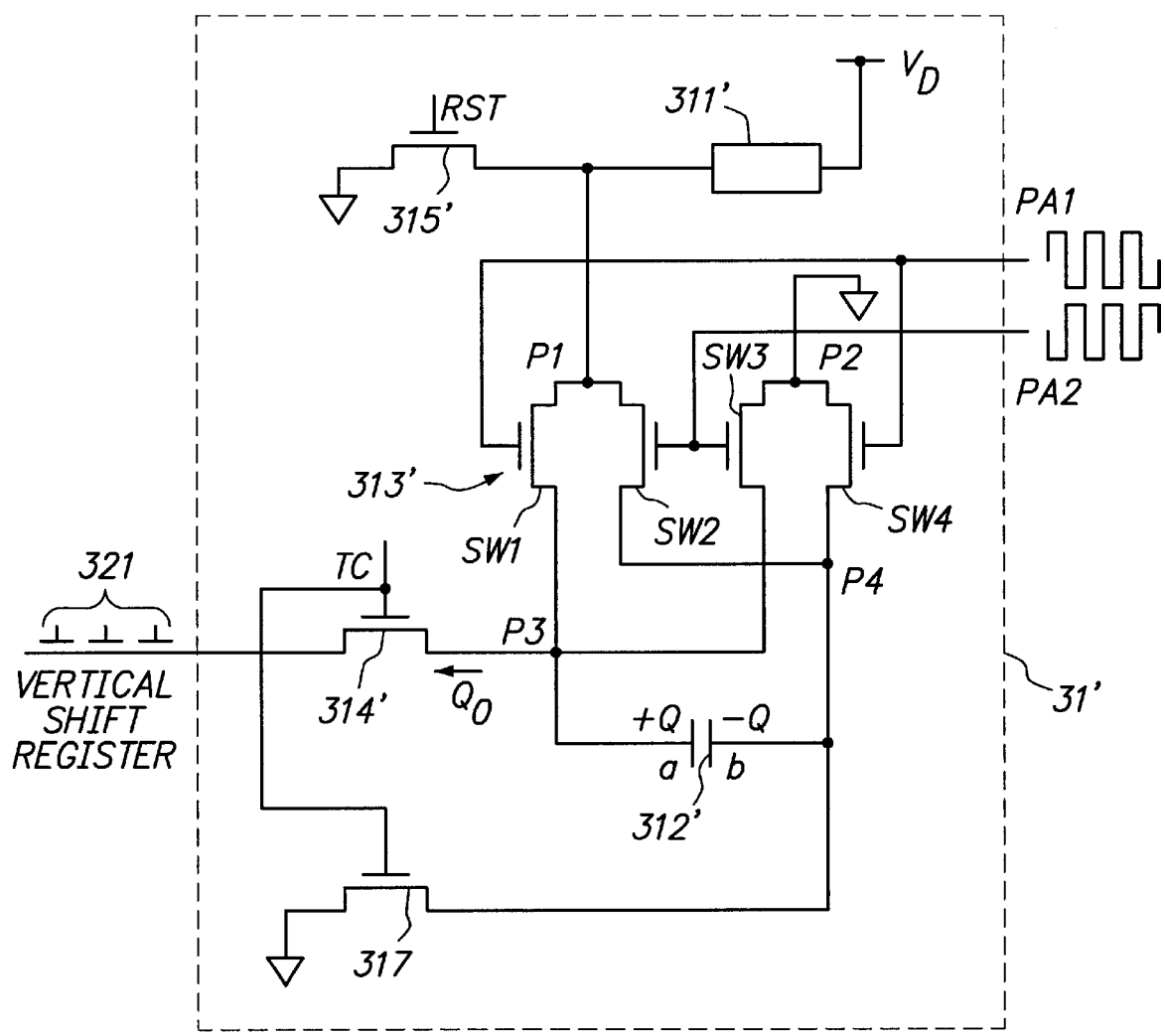
FIG. 7 is a circuit diagram of an optical detector element having a photoconductor as the light detector.

In the optical detector element 31 shown in FIG. 3, the photodiode 311 is used as the light detector. FIG. 7 shows an alternative embodiment of the optical detector element in which the photoconductor 311' is used as the light detector. In the optical detector element 31', one terminal of the photoconductor 311' is connected to the reset switch 315', the other terminal of which is connected to ground. In addition, the one terminal of the photoconductor 311' is connected to the common point $P_1$ of the switches $SW_1$ and $SW_2$ constituting part of the crossconnected change-over switch 313'. The cross-connected change-over switch 313' has the same structure as the cross-connected change-over switch 313 shown in FIG. 3, so will not be described again here. The other terminal of the photoconductor 311' is connected to the supply voltage $V_D$.

The common point $P_2$ of the switches $SW_3$ and $SW_4$ constituting the remainder of the cross-connected change-over switch 313' is connected to ground. The terminal a of the capacitor 312' is connected to the common point $P_3$ of the switches $SW_1$ and $SW_3$ and the terminal b of the capacitor is connected to the common point $P_4$ of the switches $SW_2$ and $SW_4$. Again, in this example, the rate at which charge flows into and is removed from the capacitor 312' is independent of the state of the cross-connected change-over switch, so the duty cycle of the detectivity of the optical detector element is determined by the duty cycle of the detection sense.

The terminal a of the capacitor 312' is also connected to one terminal of the charge transport switch 314', the other terminal of which is connected to the vertical shift register 321 (see FIG. 2). In addition, the terminal b of the capacitor 312' is connected to one terminal of the switch 317, the other terminal of which is connected to ground. The switch 317 connects the terminal b of the capacitor to ground in response to the transfer signal TC. Thus, to transfer the charge ($Q_0$) stored in the capacitor to the vertical shift register, the transfer signal TC causes the charge transfer switch 314' to connect the terminal a of the capacitor to the vertical shift register and simultaneously causes the switch 317 to connect the terminal b of the capacitor to ground.

The optical detector element 31' shown in FIG. 7 operates in a similar manner to that of the optical detector element 31 shown in FIG. 3, and as described above with reference to FIGS. 4A–4E, 5A–5E and 6A–6E. Accordingly, a description of the operation of the optical detector element 31' has been omitted.

Figure 8:
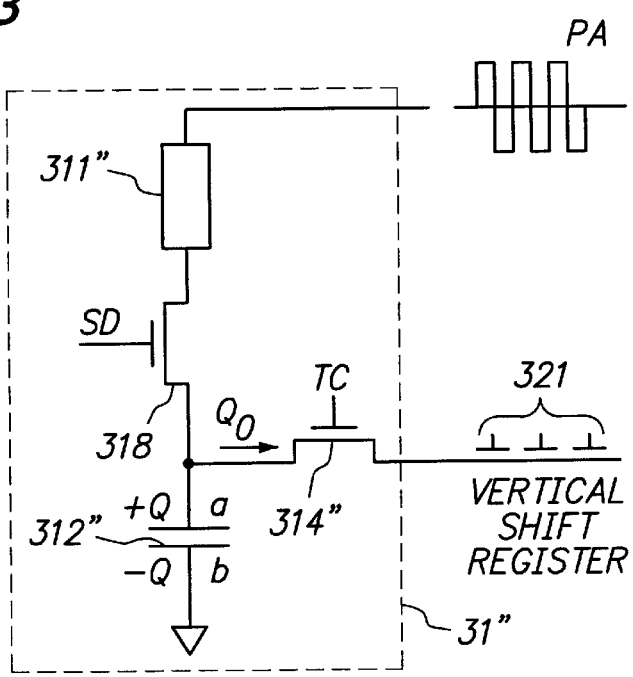
FIG. 8 is a circuit diagram of an alternative embodiment of an optical detector element having a photoconductor as the light detector.

FIG. 8 shows an alternative optical detector element 31" that can be used instead of the optical detector element 31 shown in FIG. 3 or the optical detector element 31' shown in FIG. 7. In the optical detector element 31", the photoconductor 311" is used as the light detector. The photoconductor 311", the shutter switch 318, and the terminal a of the capacitor 312" are connected in series. The shutter switch is controlled by the shutter signal SD. The terminal of the photoconductor 311" remote from the shutter switch 318 is driven by the control signal PA. The terminal b of the capacitor is connected to a reference potential and the control signal PA swings symmetrically about this reference potential. In the example shown, the reference potential is ground. The junction of the shutter switch 318 and terminal a of the capacitor 312" is connected to the vertical shift register 321 (see FIG. 2) through the charge transport switch 314".

The optical detector element 31" in FIG. 8 differs from the optical detector element 31 shown in FIG. 3 or the optical detector element 31' shown in FIG. 7 in that the detection sense of the optical detector element 31" is reversed by the control signal PA swinging symmetrically about the reference potential to which the capacitor 312" is connected. When the control signal is greater than the reference potential, the detection sense of the optical detector element is positive and charge flows into the capacitor 312" through the photoconductor 311". When the control signal is less than the reference potential, the detection sense is negative, and charge flows out of the capacitor through the photoconductor. The charge that accumulates in the capacitor 312" is generated by the photoconductor mainly or exclusively in response to the reflected modulated light LR', depending on the duty cycle of the control signal PA. The duty cycle of the control signal PA determines the duty cycle of the detection sense. Since the control signal swings symmetrically about the reference potential, the rate at which charge flows into and is removed from the capacitor 312" is independent of the state of the control signal, and the duty cycle of the detectivity of the optical detector element 31" is determined by the duty cycle of the detection sense.

The exposure time, i.e., the time during which the charge that is later transferred to the image data generator accumulates in the capacitor 312", is determined by the shutter switch controlled by the shutter signal SD. When the shutter switch turns OFF at the end of the exposure time, the transfer signal TC turns the charge transport switch 314" ON, and the charge $Q_0$ accumulated in the capacitor 312" is transferred via the vertical shift register 321 and the horizontal shift register 322 (FIG. 2) to the image data generator 33 (FIG. 2).

By illuminating the subject with modulated light, the electronic camera according to the invention can take pictures in which only the subject appears, can enhance the subject relative to the background, and can enhance or diminish a desired hue characteristic of the subject without requiring the use of complex image processing performed by a computer. The effects of backlighting can be eliminated or reduced, and pictures of backlit subjects in which the subject is correctly exposed can be taken. Finally, picture noise caused by the dark current of the light detectors can be reduced or eliminated from the picture.

Although this disclosure describes illustrative embodiments of the invention in detail, it is to be understood that the invention is not limited to the precise embodiments described, and that various modifications may be practiced within the scope of the invention defined by the appended claims.

I claim:

1. An electronic camera, comprising:
    a light source arranged to illuminate a subject;
    an image sensor that generates an output signal in response to light, the image sensor having:
        a positive detection sense in which the light causes the output signal to increase, and
        a negative detection sense in which the light causes the output signal to decrease;
    a lens arranged to focus light from the subject on the image sensor; and
    control means for modulating the light source to generate amplitude-modulated light and for changing the detection sense of the image sensor between the positive detection sense and the negative detection sense in phase with the modulation of the amplitude-modulated light.

2. The electronic camera of claim 1, in which the control means modulates the light source to generate the amplitude-modulated light with a duty cycle of ½ and changes the detection sense of the image sensor between the positive detection sense and the negative detection sense with a duty cycle such that the image sensor has a symmetrical detectivity.

3. The electronic camera of claim 1, in which the control means changes the detection sense of the image sensor between the positive detection sense and the negative detection sense with a duty cycle such that the image sensor has an asymmetrical detectivity.

4. The electronic camera of claim 3, in which the control means modulates the light source to generate the amplitude-modulated light with a duty cycle of ½.

5. The electronic camera of claim 3, in which the control means changes the detection sense of the image sensor between the positive detection sense and the negative detection sense with a duty cycle of ½.

6. The electronic camera of claim 1, in which the image sensor includes an array of optical detector elements each including:
   a light detector,
   a charge storage device, and
   means, operating in response to the control means, for changing a sense in which charge generated by the light detector in response to light is accumulated in the charge storage device from increasing the charge in the charge storage device to decreasing the charge in the charge storage device.

7. The electronic camera of claim 6, in which:
   the means for inverting includes a pair of cross-connected change-over switches operated by the control means, the change-over switches having a pair of input terminals and a pair of output terminals;
   the light detector is connected to the input terminals of the change-over switches; and
   the charge storage device is connected to the output terminals of the change-over switches.

8. The electronic camera of claim 7, in which the light detector includes a photodiode.

9. The electronic camera of claim 7, in which the light detector includes a photoconductor.

10. The electronic camera of claim 6, in which:
    the means for inverting includes:
      a reference potential, and
      a control signal generated by the control means, the control signal alternating about the reference potential; and the light detector and the charge storage device are connected in series between the control signal and the reference potential.

11. The electronic camera of claim 10, in which:
    the light detector includes a photoconductor; and
    the optical detector element additionally comprises a shutter switch connected in series with the light detector and the charge storage device.

12. The electronic camera of claim 1, in which the light source includes one of a light-emitting device, a laser and an electronic flash.

13. The electronic camera of claim 1, in which the control means changes the detection sense of the image sensor at a frequency high enough to prevent saturation of the image sensor.

14. The electronic camera of claim 1, additionally comprising means for changing hue of the amplitude-modulated light.

15. The electronic camera of claim 1, in which:
    the image sensor generates a picture signal in response to exposure to the light from the subject for an exposure time; and
    the control means changes the detection sense of the image sensor once during the exposure time.

16. An electronic camera, comprising:
    a light source arranged to illuminate a subject;
    means for modulating the light source to generate amplitude-modulated light;
    an image sensor having a lower sensitivity to ambient light than to the amplitude-modulated light reflected by the subject; and
    a lens arranged to focus light from the subject on the image sensor.

17. The electronic camera of claim 16, in which:
    the image sensor has a detection sense having a positive state and a negative state; and
    the camera additionally includes means for setting the detection sense of the image sensor to the negative state in synchronism with the amplitude-modulated light having a low intensity.

18. The electronic camera of claim 16, in which:
    the image sensor includes an array of optical detector elements each including a light detector and a charge storage device; and
    the means for setting the detection sense of the image sensor includes means for storing charge generated by the light detector in, and for removing charge generated by charge storage device from, the charge storage device, the means storing charge when the amplitude-modulated light has a high intensity and removing charge when the amplitude-modulated light has a low intensity.

* * * * *